United States Patent [19]

Arter et al.

[11] 4,032,982

[45] June 28, 1977

[54] ADAPTIVE VOLTAGE CONTROL OF MOTOR IN AN INCREMENTING MAGNETIC TAPE TRANSPORT

[75] Inventors: Nelson K. Arter; Howard C. Jackson, both of Longmont, Colo.

[73] Assignee: International Business Machines Corporation, Armonk, N.Y.

[22] Filed: Aug. 29, 1975

[21] Appl. No.: 609,131

[52] U.S. Cl. .................................. 360/74; 360/84; 318/696; 310/49 R

[51] Int. Cl.² ................. G11B 15/32; G11B 15/58; G11B 15/20

[58] Field of Search ................ 360/74, 71, 69, 84; 310/49; 318/138, 696; 242/184, 186, 189, 190

[56] References Cited

UNITED STATES PATENTS

| | | | |
|---|---|---|---|
| 3,386,018 | 5/1968 | Smith-Vaniz | 310/49 |
| 3,445,741 | 5/1969 | Gerber | 310/49 |
| 3,465,225 | 9/1969 | O'Regan et al. | 310/49 |
| 3,487,392 | 12/1969 | Lewis | 360/74 |
| 3,593,097 | 7/1971 | Gebelein, Jr. | 318/138 |
| 3,864,739 | 2/1975 | Jackson | 360/71 |
| 3,868,557 | 2/1975 | Scott, Jr. | 318/696 |

*Primary Examiner*—Alfred H. Eddleman
*Attorney, Agent, or Firm*—Joscelyn G. Cockburn

[57] ABSTRACT

In a rotating head magnetic tape transport, the tape is maintained stationary as the head sweeps a selected data track. A length of tape is buffered in a vacuum column between a supply spool and a rotating head station. A take-up spool on the opposite side of the head station is controlled by minimizing the overshoot or undershoot of the motor driving the take-up spool as the radius of the amount of tape on the spool increases or decreases (i.e., change). After a step operation, the overshoot or undershoot of the motor is measured and compared with a reference range to determine if the undershoot or overshoot is within the reference range. If the measured quantity is within the reference range, no adjustment is made. If the measured quantity is outside of the voltage level or reference range, the gain of the take-up motor is adjusted.

16 Claims, 23 Drawing Figures

STOP/LOCK COUNT (a)

FIG. 9B

STOP/LOCK SIGN (b)

FIG. 9C

BACKWARD PULSE (c)

FIG. 9D

FORWARD PULSE (d)

FIG. 9E

COUNT UP (e)

FIG. 9F

COUNT DOWN (f)

FIG. 9G

DAC (g)

ADAPTIVE VOLTAGE CONTROL OF MOTOR IN AN INCREMENTING MAGNETIC TAPE TRANSPORT

BACKGROUND OF THE INVENTION

1. Field of Invention

The invention relates to the field of magnetic telegraphones, and more specifically, to magnetic tape units employing one or more rotating heads which record and/or reproduce machine-convertible information while moving in transducing relationsip with a stationary magnetic web or tape. This information being oriented as magnetic domains to form information tracks which extend generally traverse to the longitudinally tape length. In particular, the invention deals with servo-mechanical control of the motors in the tape unit so that a selected information track is brought into transducing relationship with the rotating heads.

2. Prior Art

Rotating head magnetic tape units are widely known. In one form, a generally cylindrical mandrel or drum includes a rotating head wheel which carries one or more read/write heads. The magnetic tape engages the mandrel at one point, makes a helical wrap about at least a portion of the mandrel, then exits the mandrel at a point which is both axially and circumferentially spaced from the entrance point. The angle of helical tape wrap can vary in accordance with design choice, but is usually between 180° and 360°. The head wheel rotates so as to sweep its magnetic heads traversely across the tape. The angle at which the head enters and exits the tape may vary, in accordance with design choice, from slightly less than 90° to a small angle, such as 15°.

Another form of device is one wherein the head wheel is associated with a tape guiding structure which bends the tape traversely into an arcuate shape that conforms to the circumferential shape of the head wheel. In this device the tape travels in a generally straight line past the head wheel and is traversely bent by the associated guides as it enters the head wheel area.

The present invention finds utility with either aforementioned type of device and has been found particularly useful with helical wrap device.

The format of the magnetic media is essential for the proper operation of the above-described devices. Basically, the magnetic media has identification tracks, servo tracks and data tracks. The servo tracks are substantially parallel to the horizontal edge of the magnetic media; so that as the magnetic head makes a traverse sweep across the tape, either the servo tracks or the identification tracks are frist encountered. Likewise, the data tracks are inclined to the servo tracks at an angle substantially equivalent to the angle at which the head enters and exits the tape. With this orientation, as the head sweeps traversely across the tape, data is transduced (i.e., read or write) from a selected data track.

There are two major problems associated in transducing data with the above devices.

One of the major problems encountered is that of establishing and maintaining accurate positional alignment between the path of the head wheel carrying the read/write head and the tape's data track. This is particularly true when the data track is written on one tape transport unit and later read by another tape unit. This problem is solved by U.S. Pat. No. 3,864,739 issued to Howard C. Jackson and U.S. Pat. No. 3,845,500 issued to Gary A. Hart. Both patents are assigned to International Business Machines Corporation, the assignee of the present invention.

The other major problem with which the present application is concerned is that of controlling the motor which drives the take-up spool of the tape system; so as to reduce overshoot and/or undershoot of the motor.

In order to step the tape from one data track to the next data track requires that the take-up spool be rotated. By energizing the take-up spool motor, the step function is performed. Once the motor is energized, the motor tends to hunt or ring (i.e., the motor tends to oscillate about its zero point before it comes to a final stop.) Thus hunting either tends to skew the tape in relationship with the head or aligning the incorrect data track with the head. Either situation, i.e., skewing or presenting the incorrect data track results in the system issuing servo errors or writing data in the wrong data track.

Two phenomenons are responsible for the damp oscillatory mode of the motor. The first phenomena is due to the gain of the system, while the second phenomena is due to the inertia of the load, i.e., the inertia of the media on the take-up spool.

It is well known in the prior art that the ringing of a motor driving a load can be controlled by changing the gain of the motor. In the so-called bang-bang servo mechanical positional control system, of the prior art, the driving arrangement (i.e., motor) is operated at maximum acceleration until the midpoint between an initial and selected positions is reached, and at maximum deceleration from the midpoint to the selected position. In theory, such a system will provide an optimum drive between positions with minimum oscillation about the selected position since the equal but opposite accelerations which switch at the midpoint position provided that zero velocity is reached at the selected position.

However, in practice, zero velocity is not always reached when the motor approaches the selected position. The residual velocity enables the motor to hunt or ring about the selected position. Due to hunting the bang-bang method of motor control is not satisfactory for several applications wherein precise motor control is required.

Moreover although the bang-bang systems function satisfactorily for their intended purposes, these systems are beset by several problems which render them inapplicable for this precision servomechanical position control system.

One of the problems which the bang-bang system faces is the ability to determine accurately the midpoint between the initial and selected position so that the acceleration/deceleration energy can be applied to the driving arrangement. The prior art system uses various sophisticated and expensive electronic circuitry for sensing the midpoint position. Due to the high cost for the electronic circuitry, the unit cost of the system tends to increase. The current trend is to minimize the cost of systems, and therefore the prior art devices are less acceptable.

Another problem with the prior art device is the constraint that the load had to be fixed, i.e., constant. With a constant load, the gain of the driving arrangement (e.g., an amplifier/motor combination) can be adjusted at the factory to meet optimum positioning of the load without overshoot or undershoot. In other words, once the constant inertia of a load is known, then the gain of the driving arrangement is adjusted so that the energization to the driving arrangement is such that the overshoot or undershoot (i.e., ringing) is minimized.

The prior art scheme works satisfactorily when the amplifier/motor combination is driving a constant load. However, there are several applications wherein the load changes constantly; i.e., the load is variable. For example, in the rotating head tape system previously discussed, the amount of tape on the take-up spool constantly changes. With the changes in tape, the inertia (load) of the take-up spool varies. It is, therefore, necessary to be able to control the motor when the load varies so as to minimize overshoot and/or undershoot. Since the prior art devices are restricted to fixed load conditions, they are not suitable to control the motor in a situation where the load varies.

Still another problem with the prior art device is that the gain of the driving arrangement is fixed. Generally, the gain of the prior art systems is controlled by a potentiometer (that is, a variable resistance). With the prior art devices the potentiometer is adjusted so as to set the gain to a fixed value prior to delivery for shipment from the factory. Any attempt to change the gain from its previous setting requires the service of a highly skilled engineer or technician. This stems from the fact that changing the gain of the system will affect the overall operation of the device. In fact, there are several systems wherein the gain of the system is fixed permanently and cannot be varied. However, there are several instances wherein it is necessary to dynamically adjust the system gain so as to enhance the system performance. For example, in a situation wherein the frictional force in the system changes, inability to dynamically adjust the system gain will result in performance degradation.

OBJECTS OF THE INVENTION

It is therefore the object of this invention to control the driving motor of a load in a more efficient and inexpensive manner than was heretofor possible.

It is still another object of this invention to adaptively or dynamically adjust the gain of a positional control system.

It is still a further object of this invention to minimize the overshoot and/or undershoot (i.e., ringing) of the motor driving the load in a positional control system.

It is still another additional object of the invention to adaptively control a variable load so that ringing is minimized.

SUMMARY OF THE INVENTION

The present invention overcomes the enumerated prior art problems by a unique combination of electrical circuitry. The combination of electrical circuitry (logic) interrogates the system after an issued step command is completed. For example, in the rotating head tape unit where this invention is implemented, memory circuits retain information about the prior state of the motor driving the take-up spool. In other words if during the performance of a step command wherein the take-up spool motor is commanded to advance the tape by a series of step operations, the take-up spool motor had an overshoot or undershoot (i.e., ring about its positional destination) this information (i.e., the overshoot or undershoot) is stored in a memory circuit. Then prior to performing the next step operation, the combination electrical circuit interrogates the memory circuit and changes the gain to the spool motor if it had undershot or overshot its destination on performing its previous step operation.

In still another embodiment of the invention, a non-linear circuit means is incorporated within the combination electrical circuit means. This non-linear circuit means controls system gain so that if the spool motor had an overshoot while performing a previous step operation, the gain to the motor is increased prior to performing a subsequent step. Likewise, if the spool motor had an undershoot, the gain to the motor is decreased.

In one embodiment of the invention, overshoot or undershoot of the spool motor is determined by a logical network. The logical network senses the magnitude of the count that is contained within a stop/lock (S/L) counter (i.e., an up/down counter) simultaneously with a direction reversal. The direction reversal circuitry outputs a signal whenever a direction reversal occurs. The combination of the contents of the S/L counter and the direction reversal signal determine whether an overshoot or an undershoot occurs.

In another embodiment of the invention, the overshoot and the undershoot is compared with a predetermined range of reference values. If the overshoot or undershoot falls within this predetermined range, no adjustment is made to the system gain. However, if the overshoot or undershoot falls outside the allowable range, then the system gain is adaptively adjusted so as to minimize ringing during performance of the following step command.

The foregoing and other features and advantages of the invention will be apparent from the following more particular description of preferred embodiment of the invention, as illustrated in the accompanying drawings.

BRIEF DESCRIPTION OF THE DRAWINGS

FIG. 9 (A–G) shows a graphical view of how the stop/lock counter and the DAC (digital to analog converter) operates.

FIG. 10 (A–D) shows graphs of the DAC voltage versus time.

FIG. 11 (A-C) shows motor trajectory with variable gain.

DETAILED DESCRIPTION OF THE PREFERRED EMBODIMENT

Like elements are identified by similar numerals in each of the drawings. The term ringing, as used in this application, means overshoot and/or undershoot of a motor.

The present invention will be described in the environment of a rotating head magnetic tape unit. This general type of magnetic tape unit transduces data from a length of magnetic tape while the tape is stationary. Specifically, magnetic tape 10 (FIG. 3) includes a plurality of inclined data tracks 11, 12 which are swept by the rotating head while the tape is stationary. Once a given data track is transduced, that is, either written or read by the rotating head, the tape is incremented or stepped to an adjacent data track. By stepping the tape to an adjacent data track, driving means 31 which controls the take-up spool 14 tends to ring (FIG. 1); i.e., overshoot and/or undershoot which results in the misalignment of a selected track. As will be explained subsequently, this ringing results in servo errors. This invention is directed to a method and apparatus for minimizing the ringing of motor 31 and therefore reducing the number of servo errors.

Figure 2:
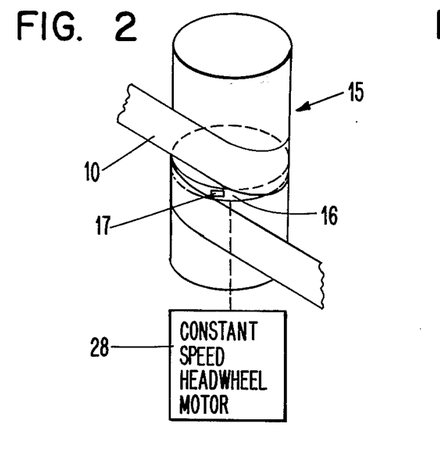
FIG. 2 is a view of the tape-wrap mandrel of FIG. 1, showing a helical wrap of tape thereabout, and showing the centrally located head wheel which carries a magnetic head or transducer.

While the present invention is described in the environment of a rotating head magnetic tape unit, and particularly the type wherein the tape forms a helical wrap about a mandrel having a centrally located head wheel as shown in FIG. 2, the present invention is not to be restricted thereto. As is well known to those skilled in the art, the length of magnetic tape may be transduced by a head which does not require relative movement (between the head and tape) during transducing, for example, a magneto-resistive head. Also, the present invention finds application in any servo mechanical application wherein the motor driving a load an incremental distance has to be regulated to minimize overshoot and/or undershoot.

Figure 1:
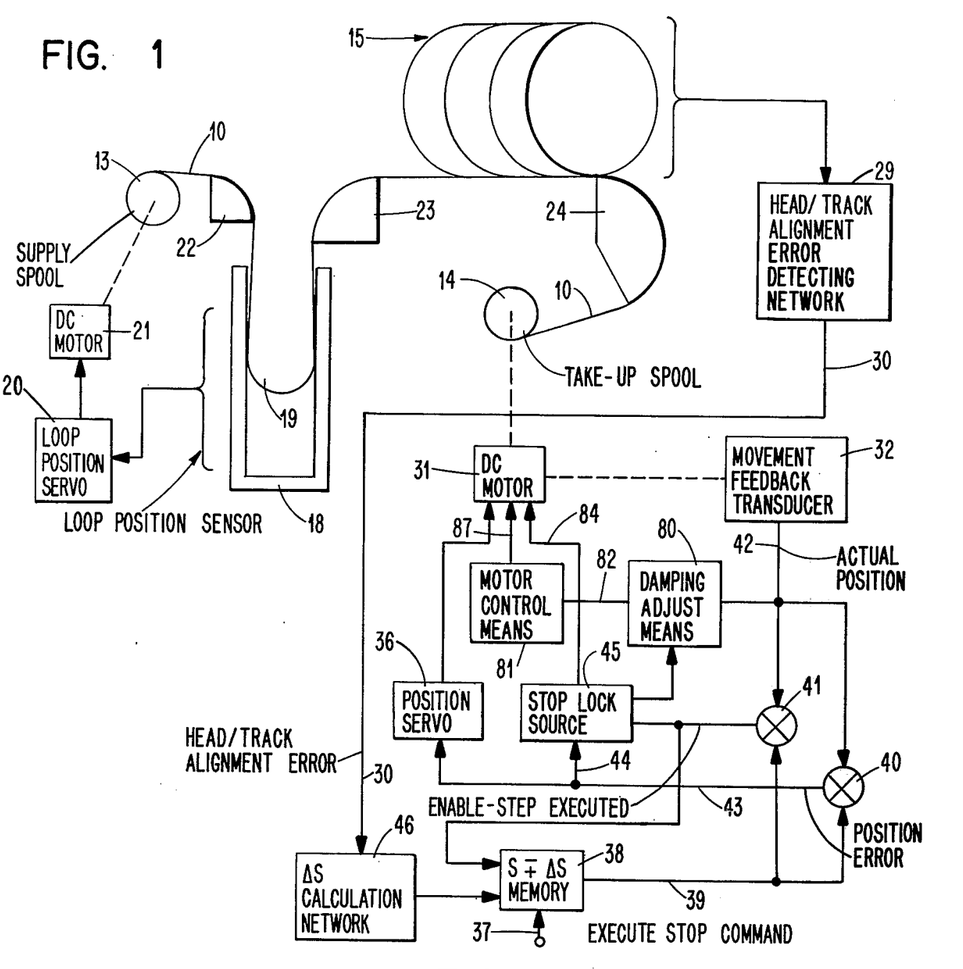
FIG. 1 is a view showing a rotating head magnetic tape unit whose take-up spool DC motor is controlled in accordance with the present invention.

Referring now to FIG. 1, a diagrammatic view of the tape path is shown. A length of magnetic tape 10 extends between supply spool 13 and take-up spool 14. The tape path extending between these two spools includes transducing station 15 whereat a helical wrap of tape is formed about a stationary mandrel having a centrally located head wheel 16 carrying head 17 as more specially shown in FIG. 2. This tape path includes a single tape buffer in the form of vacuum column 18. Vacuum column 18 controls the tension in magnetic tape 10. A loop of tape 19 is maintained in the vacuum column as the position is sensed by a loop position sensor, not shown. This loop position sensor, which may be of the type described in U.S. Pat. No. 3,122,332 H. G. Hughes, Jr., provides an input signal to loop position servo 20 to control supply spool DC motor 21, thereby maintaining loop 19 at an optimum position as the tape moves in incremental step-by-step fashion from supply spool 13 to take-up spool 14.

A preferred magnetic transducer or head configurations used as head 17 of FIG. 2, useful in establishing a stable hydrodynamic air film at the head/tape interface, is described in U.S. Pat. No. 3,821,813 issued to R. Freeman et al and commonly assigned.

As the tape passes through the tape path of FIG. 1, it is air bearing supported at 22, 23 and 24. The side edges of the tape are preferably compliantly guided particularly at air bearings 23 and 24.

Figure 3:
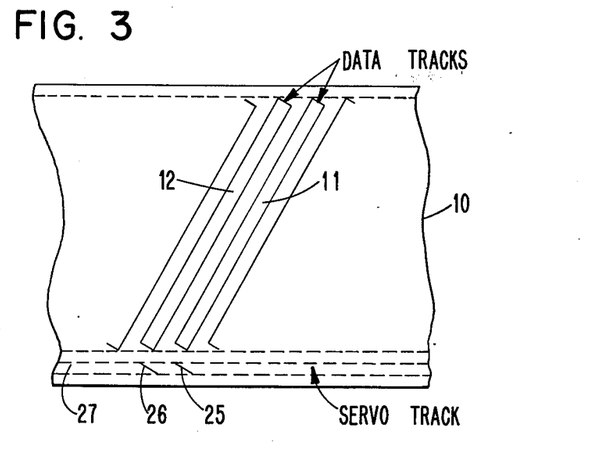
FIG. 3 is a view showing a flat section of tape and diagrammatically showing two of the many traverse data tracks and the individual servo track indicia which identify the physical location of these two data tracks.

FIG. 3 is a view showing a flat section, such as the tape section shown in FIG. 2, wherein two of the many traverse data tracks and two specific servo tracks indicia 25 and 26 are shown. Indicia 25 and 26 reside in servo track 27 serve to identify the center line of the two data tracks 11 and 12, respectively. When the section of the tape is positioned relative to the mandrel, head wheel 16 of FIG. 2 traverses a data track in exact alignment and coincides therewith. Movement of head 17 is at a constant speed as controlled by constant speed head wheel motor 28.

The exemplary showing of FIG. 3 is intended to be quite general since the particular data field format used in data tracks 11 and 12 and servo track 27 are not important to the present invention. Suffice it to say that head/track alignment error detection 29 of FIG. 1 responds to a position of indicia 25 and 26 and servo track 27 to originate head/track alignment error on conductor 30. The details of network 29 are not disclosed since this network may take many forms, for example, the format of servo track 27. Furthermore, such a network may receive its input information from either a stationary head which reads the tape servo track 27 or alternatively this servo track may be read by the rotating head itself as it enters and/or leaves the tape. Examples of acceptable network of this type can be found in U.S. Pat. No. 3,666,897 and U.S. Pat. No. 3,845,500. Both patents are commonly assigned to the assignee of the present invention.

In order to understand the present invention, only the basic tape path in FIG. 1 will be addressed. A more detailed description of each element as depicted in FIG. 1 is described in U.S. Pat. No. 3,864,739, issued to Howard C. Jackson and commonly assigned.

Still referring to FIG. 1, take-up spool 14 is driven by DC motor 31 hereinafter called driving means 31. The output shaft of driving means 31 is connected to movement feedback transducer 32. Movement feedback transducer 32 outputs a signal on conductor 42. The signal on conductor 42 is indicative of velocity and/or actual position and the direction of rotation of driving means 31. The signal from terminal 42 is fed into damping adjust means 80. Damping adjust means 80 receives information signals from stop lock (S/L) source means 45 and outputs a signal on gain control conductor 82. The gain control signal is fed into motor control means 81 which outputs gain control signal on conductor 87 to control the driving means 31. As will be explained subsequently, the signal on conductor 87 either increases or decreases the gain to driving means 31.

Driving means 31 rotates take-up spool 14 in either a clockwise or a counterclockwise direction. When spool 14 is rotated clockwise, the radius of magnetic media 10 increases. Likewise, when spool 14 is rotated in a counterclockwise direction, the radius of magnetic media 10 decreases. As such, spool 14 in combination with magnetic media 10 may be considered to be a variable load means. With a variable load means the signal on terminal 87 has to be modified dynamically so that the energization to driving means 31 is sufficient to drive spool 14 so as to position magnetic media 10 from one informational track to another informational track without overshooting and/or undershooting.

Figures 4, 5:
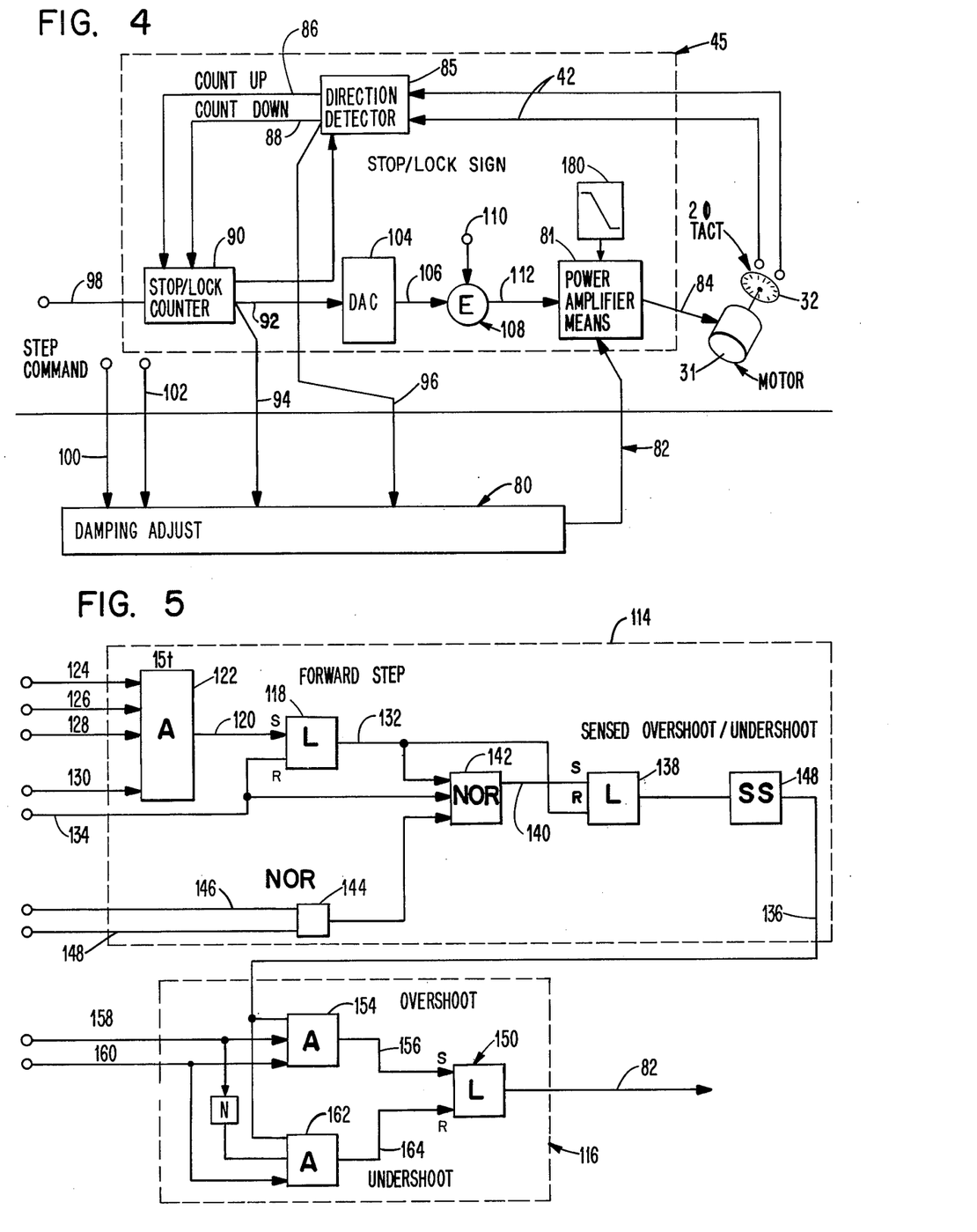
FIG. 4 shows a detailed view of the stop lock (S/L) source and means for sensing the overshoot/undershoot of the motor.
FIG. 5 depicts a detailed view of the detection-compare logic.

Referring now to FIG. 4, driving means 31, damping adjust means 80, stop lock source means 45, movement feedback transducer 32 and power amplifier control means 81 are shown in block diagram form. In the preferred embodiment of this invention, movement feedback transducer 32 is a conventional two-phase digital tachometer. The tachometer sends out two signals on terminal 42 as the motor rotates.

Figure 8A:
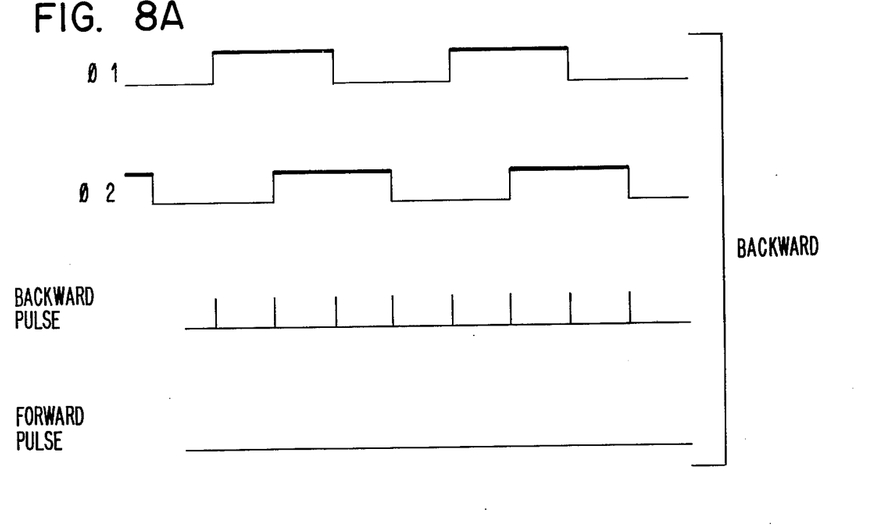
FIGS. 8A and 8B display the pulses which are outputted from a two-phase tachometer and the subsequently developed backward/forward pulses.
Figure 8B:
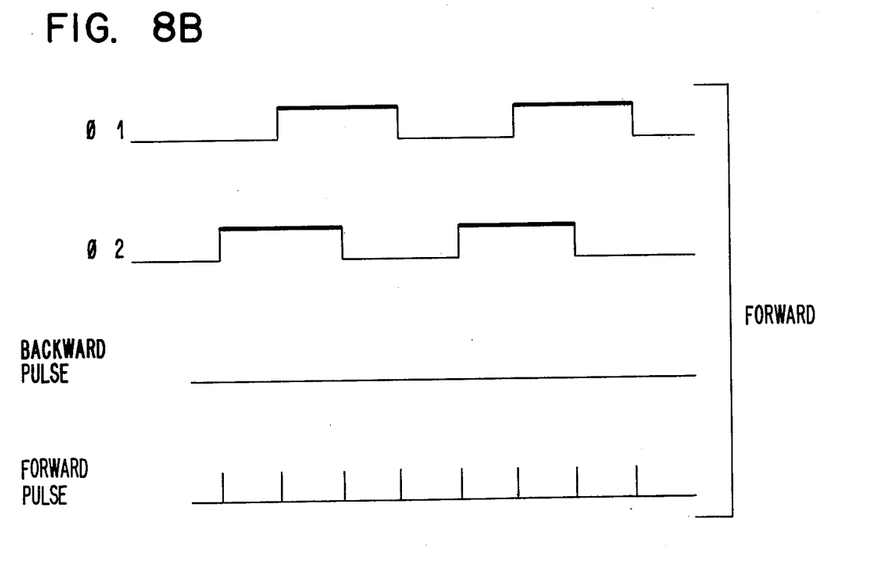
Figure 9A:
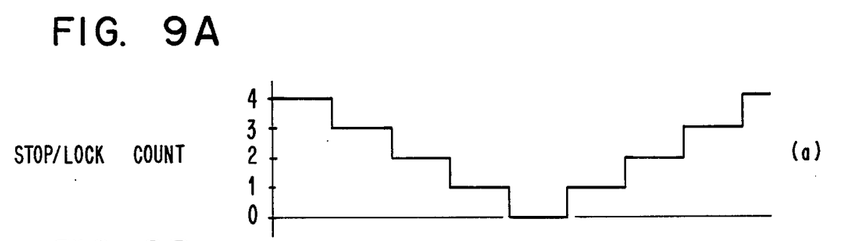
Figure 9B:
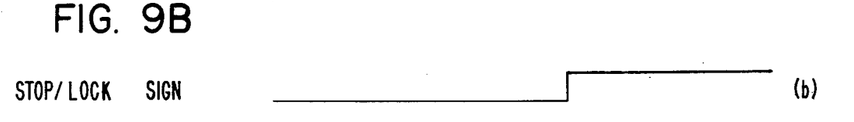
Figure 9C:
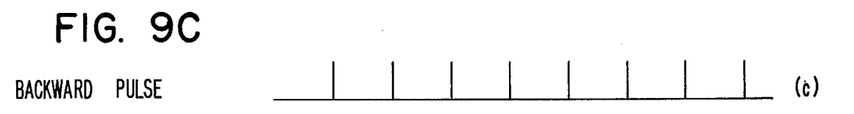
Figure 9D:
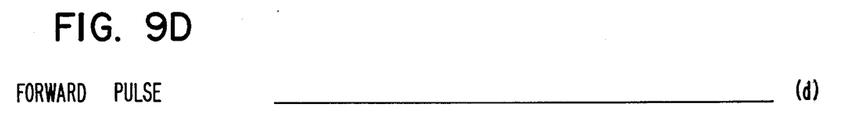
Figure 9E:
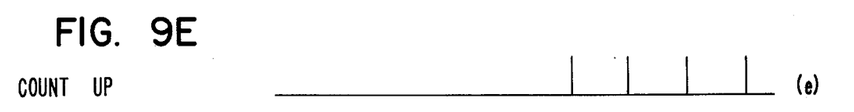
Figure 9F:
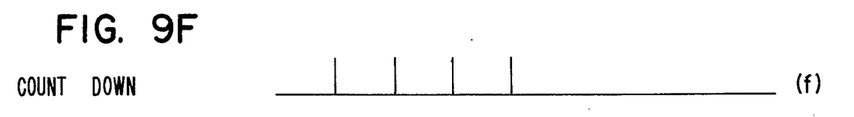
Figure 9G:
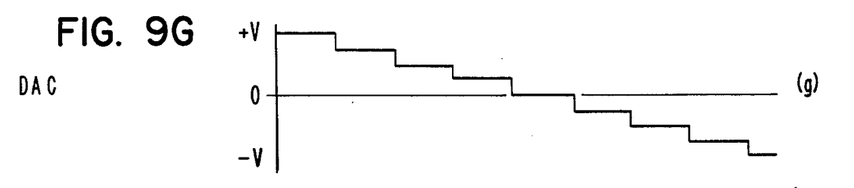

FIG. 8A and FIG. 8B demonstrates the two-pulse $\phi_1$ and $\phi_2$ that are outputted from the tachometer. The relationship between $\phi_1$ and $\phi_2$ varies depending on whether the motor is moving forward or backward.

Referring again to FIG. 4, stop lock source means 45 includes direction detector 85. Direction detector 85 converts the tachometer signals into pulse which are representative unit of distance moved by driving means 31. A more detailed description of direction detector 85 is disclosed in an article entitled "Logical Motion and Direction Detection" published in Volume 14, No. 12, May 1972, page 3672, of the IBM Technical Disclosure Bulletin.

As is shown in FIG. 8A, if driving means 31 is moving backwards, i.e., counterclockwise, direction detector 85 will output a backward pulse on conductor 88 at each transition in $\phi_1$ and $\phi_2$. As is shown in FIG. 8B, if driving means 31 is moving forward, i.e., in a clockwise direction, then direction detector 85 will output the forward pulse for each transition in $\phi_1$ and $\phi_2$. As will be explained subsequently, the signal on terminal 86 will inform stop/lock means 90 to count upwards, while the signal on terminal 88 will inform stop/lock means 90 to count down.

Stop/lock means 90 is a conventional up/down counter. It is controlled in such a way that it nevers counts down past 0. The counter control generates the stop/lock sign bit and also the count up and count down pulses. The output from stop/lock counter 90 is outputted on data bus 92. Simultaneously, certain bits from stop/lock counter 90 is fed over terminal 94 to damping adjust means 80. Also, direction information from direction detector 85 is fed over terminal 96 to damping adjust means 80. As will be explained subsequently a predetermined number is fed over terminal 98 into stop/lock counter 90. Also damping adjust means 80 is supplied with a step command on terminal 100 and timing information on terminal 102. The signals which appear on data bus 92 are digital numbers indicative of the voltage which should be applied to control motor means 31. Digital-to-analog converter 104 (DAC) converts digital numbers into an equivalent voltage level and outputs a signal on terminal 106. The signal is fed into a conventional summing circuit 108 together with other control signals on terminal 110. The control signals on terminal 110 are not necessary for the understanding of the present invention, and therefore, the control signals will not be discussed any further. Summing circuit means 108 outputs error signals at terminal 112. The error signals on terminal 112 together with the gain control signal from gain control terminal 82 are combined to drive power amplifier means 81.

In addition to the error signal and the gain control signal, non-linear circuit means 180 is connected to drive power amplifier means 81. Due to the non-linear characteristics of non-linear circuit means 180, the output from power amplifier means 81 is controlled so that as the gain is increased the overshoot of driving means 31 is decreased (i.e., the initial part of the driving signal is unaffected, but the final portion sees the higher gain).

Referring now to FIG. 9, the interrelationship between the stop/lock counter, digital-to-analog converter, and the control pulses are shown graphically. As is shown in graph 9a, a number, for example 4 is entered in stop/lock counter 90 (FIG. 4) by terminal 98. Simultaneously, the stop/lock sign as shown in FIG. 9b is negative. As driving means 31 begins to move backward, a pulse is outputted from direction detector 85. This pulse signals the counter to count downwards and the counter decrements its count to 3. This process is repeated until the count in the counter is 0. Theoretically, the motor should be stopped; however, the motor still continues to move in the backwards direction and the counter begins to count upward as is shown in graph E. Simultaneously, the sign bit in the stop/lock counter changes from negative to positive. As was stated previously, the DAC converts the output number from the stop/lock counter to a voltage level. The motor will rotate in a direction determined by the stop/lock sign bit when the voltage is not 0. As is shown in graph 9G as the count in the stop/lock counter decreases the output voltage from the DAC decreases until the 0 point is reached where the voltage to the motor changes so as to rotate the motor in the opposite direction. Although the above example shows only a few counts, any desired number of counts can be designed into the tachometer.

Figure 10A:
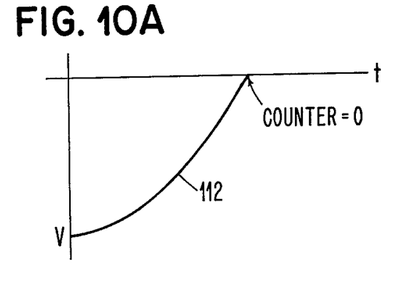
Figure 10B:
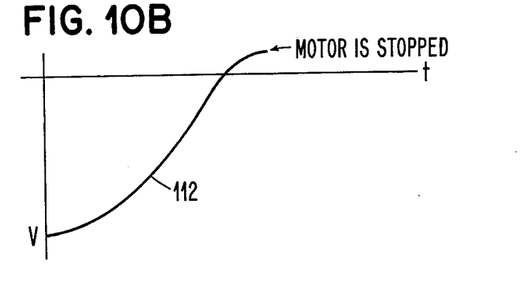
Figure 10C:
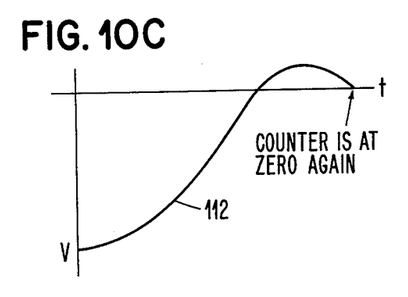
Figure 10D:
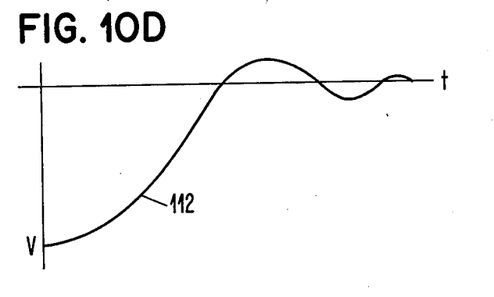

In actuality, the DAC voltage is made up of small voltage steps. However, for description purposes the DAC voltages will be shown as a smooth line (see FIG. 10). If we assume that the count in the counter has a positive sign, this will generate a positive voltage in the DAC. The power amplifier multiplies this voltage by its gain and supplies a positive voltage to the motor. This voltage will cause the motor to rotate backward and the tach will generate pulses. The direction detector will sense the pulses and generate backward pulses which will cause the counter control to send out count down pulses. This will decrease the count in the counter until it is 0 (as shown in FIG. 10A).

Overshoot is created because driving means 31 is still moving when the counter reaches 0. This motion will continue to generate tach pulses, and the counter control will get more backward pulses but the counter control will change the stop/lock sign bit and generate count up pulses (see FIG. 10B). This will create a negative voltage on the motor. If the motor continues to coast backward, the voltage will increase in magnitude until the motor stops. Now the negative voltage will drive the motor forward until the voltage is 0. The forward pulses generated will count the counter down to 0 (see FIG. 10C). Depending on the system damping this overshoot cycle could repeat again several times (see FIG. 10d), but the system will eventually stabilize.

Figure 11A:
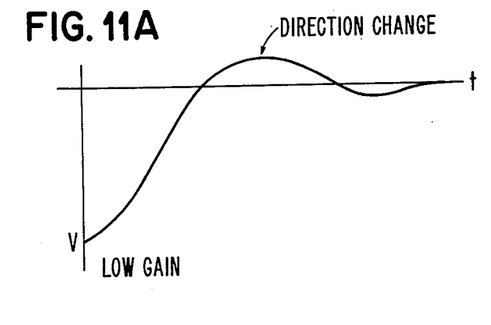
Figure 11B:
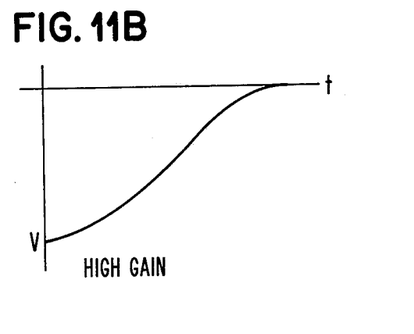
Figure 11C:
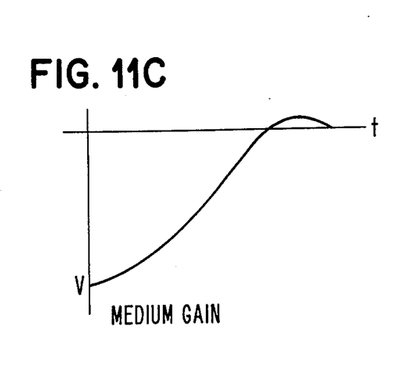

FIGS. 11A, 11B and 11C demonstrate different types of system with different gains. FIG. 11A demonstrates a low-gain system which reaches its desired position but has overshoot. FIG. 11B demonstrates a high-gain system which has no overshoot, but requires more time to reach its desired position. FIG. 11C demonstrates a medium gain system with little overshoot.

Referring now to FIG. 5, logic means 114 and compare means 116 are shown. Logic means 114 and compare means 116 are located within damping adjust means 80 of FIG. 4.

Logic means 114 determines when driving means 31 is moving forward, i.e., doing a forward step and outputs a pulse when the first undershoot or overshoot of driving means 31 is sensed. In order to perform these functions, latch 118, hereinafter called first storage means 118, is set when a forward step command appears on terminal 120. The signal on terminal 120 is supplied from AND circuit means 122, hereinafter called first AND circuit means 122. First AND circuit means 122 is a conventional four-way AND circuit. The input signals on terminals 124, 126, 128 and 130 control the signal which appears on terminal 120. In the preferred embodiment of this invention, the signal on terminal 124 is a control signal which signifies when the machine is performing a forward step.

The signal on terminal 126 is a control signal taken from bit 6 of the stop-lock counter. The signal on terminal 128 is a control signal taken from bit 7 of the stop/lock counter. The signal on terminal 130 is a control signal which is outputted when the motor is moving in a forward direction. When the first storage means 118 is set, i.e., an ON signal will appear on terminal 132 which indicates that the motor is doing a forward or backward step. To reset first storage means 118, a control signal is applied by terminal 134.

Once it has been determined that the motor is in the process of doing a forward step the first overshoot or undershoot is sensed and a signal is outputted on terminal 136. In order to sense only the first peak of the overshoot or undershoot latch 138, hereinafter called second storage means 138, is set, i.e., turned on. The set signal to second storage means 138 is supplied on terminal 140 from NOR circuit means 142 hereinafter called second logical NOR circuit means 142. Second logical circuit means 142 is a conventional 3 input NOR circuit. The first input to the second logical NOR circuit means 142 is supplied from first storage means 118. The second input is supplied from the control signal on terminal 134, and the third input is supplied from the output of a conventional NOR circuit means 144. NOR circuit means 144 is a conventional two-input circuit. The circuit will output a signal when either one of the two input conditions occurs. The first condition is a time-out pulse which appears on terminal 146. The other condition is a backward pulse which appears on terminal 149 when a direction reversal occurs. Second storage means 138 is reset when the first storage means is off. When second storage means 138 comes on, it turns on timing means 148. Timing means 148 is a conventional single shot circuit. In the preferred embodiment, timing means 148 is set to output a 30 to 50 NS pulse on terminal 136.

Once the overshoot/undershoot, i.e., the ringing of motor means 31 has been sensed, compare means 116 determines whether the ringing was an overshoot or an undershoot and stores the result in latch 150, hereinafter called third memory means 150. The output from third memory means 150 appears on gain adjustment line 82. As will be explained subsequently, the signals on gain adjustment line 82 (see FIG. 6) is used to control the gain of power amplifier 81 driving motor means 31.

Still referring to FIG. 5, if the ringing of motor means 31 was an overshoot, AND circuit 154, hereinafter called third AND circuit means 154, is set and a signal is outputted on terminal 156. AND circuit means 15 is a conventional three-input AND circuit. The signal which appears on the first input is a signal from timing means 148. The signal which appears on terminal 158 is a controlled signal which indicates the sign of the stop/lock counter. The third signal into third AND circuit means 154 is applied on terminal 160. The signal on terminal 160 is indicative of a predetermined value in the stop/lock counter. Whenever the count in the stop/lock counter is greater than or equal to this predetermined value, then terminal 160 becomes active. In the preferred embodiment of this invention, the predetermined value (count) is chosen to be 3.

If the ringing of motor 31 was an undershoot, then AND circuit means 162, hereinafter called fourth AND circuit means 162, will come on. In order to turn on fourth AND circuit means 162, the polarity on terminal 158 has to be in a state opposite to the state in which third AND circuit means 154 was turned on. Stated in another way, if third AND circuit means 154 was to output a signal on terminal 156 and its input signals on terminals 136, 158 and 160, respectively, were all positive, then fourth AND circuit means 162 will output a signal on terminal 164 when the input on terminal 158 is of opposite polarity, i.e., negative, and the signals on terminals 136 and 160 are positive. The fact that polarities are assigned to the various signals in discussing the invention should be regarded as only illustrative rather than a limitation on the scope of the invention, since it is well within the state of the art to use either positive or negative signals in designing combinational logic to perform a desired function.

Figure 6:
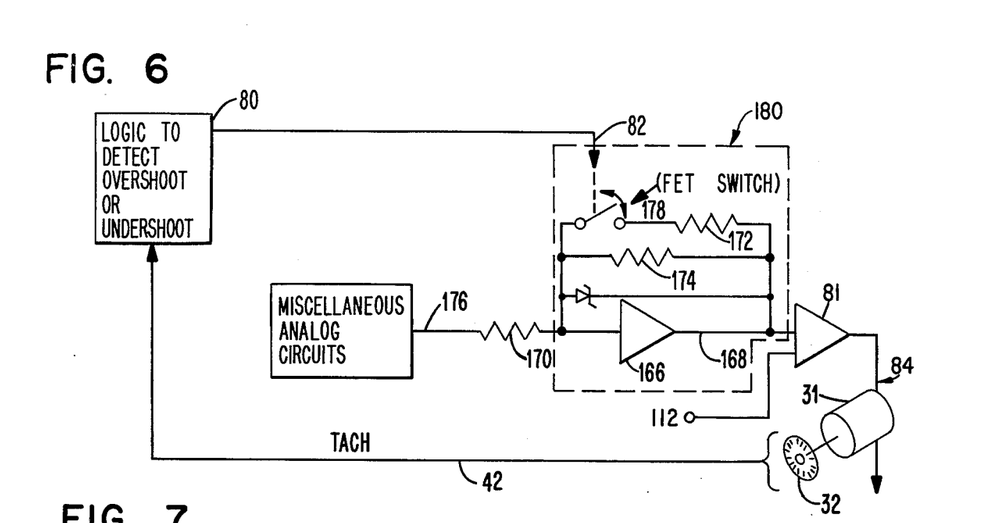
FIG. 6 depicts the circuit for adjusting the gain of the motor.

Referring now to FIG. 6, the gain adjustment means to motor means 31 is shown. Motor means 31 is driven by power amplifier 81. Power amplifier 81 is in turn driven by operational amplifier 166. By controlling the gain of operational amplifier 166 at node 168, the gain to power amplifier 81 and hence to motor 31 can be varied. Theoretically, the gain at node 168 can be expressed as $R_F$ divided by $R_{in}$ ($R_F/R_{in}$) where $R_F$ is equal to the feedback resistors in the circuit and $R_{in}$ is the input resistance into the circuit. As shown in FIG. 6, $R_{in}$ ($R_{170}$) = resistive means 170; while $R_F$ ($R_{172}$, $R_{174}$) is equal to $R_{174}$ or the parallel combination of $R_{174}$ and $R_{172}$, depending on which gain setting is selected.

In order to selectively control the amplitude or gain of the signal at node 168 so that the gain of operational amplifier 166 can be increased without creating unusual ringing of driving means 31, non-linear circuit means 180, hereinafter called zenner diode 180, is placed in parallel with the operational amplifier. With this configuration if an overshoot occurs in driving means 31, the condition is corrected by increasing the gain to power amplifier 164.

In the preferred embodiment of this invention a zenner diode is used. Of course it is within the skill of the art to substitute conventional non-linear circuit components without departing from the scope of this invention.

With this relationship by tying node 168 (i.e., the output of operational amplifier 166) through feedback resistors 172, 174 to the input of operational amplifier 166, the gain can be changed by changing the resistive value of feedback resistors 172 and 174. In order to change the resistance switch means 178 is introduced into the path of the feedback resistors. In the preferred embodiment of this invention, switch means 178 is a conventional FET switch. Switch means 178 is under the control of gain control terminal 82. For example, if after a step command damping adjust means 80 requires a lower gain for the next step, then the signal on conductor 82 would close switch means 178. With switch means 178 closed, the gain would be reduced. Theoretically, the gain is equivalent to $$\frac{1}{R_{170}} \cdot \frac{R_{172} R_{174}}{R_{172} + R_{174}}.$$

Similarly, if damping adjust means 80 requires a higher gain for the next step, then the signal on conductor 82 would open switch means 178. With switch means 178 open, the gain is equivalent to $R_{170}/R_{174}$.

Figure 7:
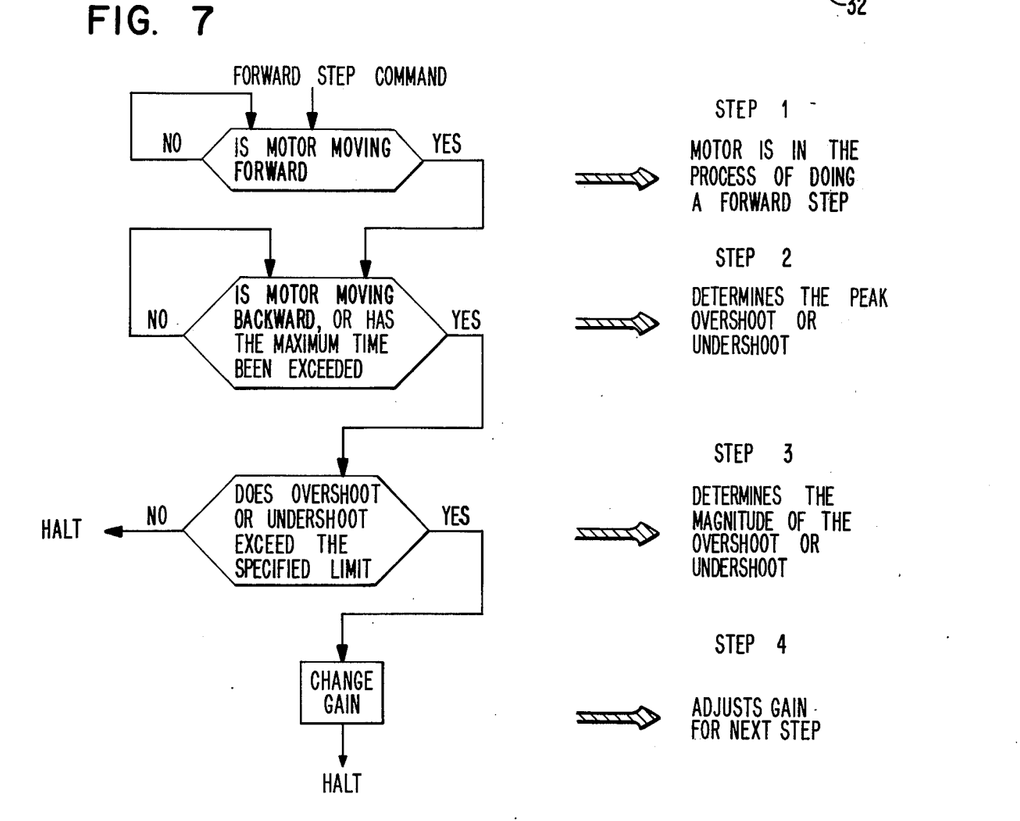
FIG. 7 depicts a flow diagram of the system operation.

Referring now to FIG. 7, a graphical view of the system operation is shown. In order to control the motor so as to minimize ringing steps 1 through step 4 are performed by the prior discussed electrical circuits. During step 1, the electrical circuits determine if motor 31 is in the process of doing a forward step. The circuit then determines the first peak overshoot or understoot of the motor. The magnitude of the overshoot or undershoot is determined next. It is then determined if the ringing is an overshoot or it if is an undershoot. The gain is then adjusted so as to minimize the ringing. The testing functions are then performed after the completion of a step command and the gain to motor means 31 is adjusted prior to performing the next step. This completes the detailed description of the preferred embodiment.

OPERATION

In operation, the undershoot or overshoot (ringing) of motor means 31 is sensed after the completion of a step command. The magnitude of the overshoot or undershoot is compared with a predetermined reference. If the magnitude of the overshoot or undershoot is within the range of the predetermined value, no corrective step is taken. However, if the magnitude of the overshoot or undershoot is outside of the predetermined range, the gain of motor means 31 is adjusted.

To achieve this objective, a digital number for example, between 56 and 80 is placed into stop/lock counter 90 over terminal 98. The number will appear on terminal 92 and convert into voltage by DAC 104. The voltage is used for controlling power amplifier 81 which drives motor means 31. As motor means 31 begins to move, the movement feedback transducer 32 (two-phase tach) outputs pulses on terminal 42. The pulses are indicative of the direction and the distance moved by motor means 31. The pulses on terminal 42 are converted by direction detector 85 into count up or count down pulses. For this example, assume that a negative number is in counter 90 then the output from direction detector 85 would be on terminal 88, i.e., count down pulses. As count down pulses appear on terminal 88, stop/lock counter 90 will continue to decrement its contents. Simultaneously, the DAC will be converting the lower count into voltage and using the new voltage to drive motor 31. Stop/lock counter 90 will continue to count until the contents is 0. Theoretically, at 0 count the motor should be stopped. However, due to its inertia, it may continue to move in the same direction. At this point, the sign bit in the counter will change from a negative to a positive sign. This change will occur when the motor is at the beginning of its overshoot (See FIG. 11A). At this point, the overshoot is measured by interrogating stop/lock counter 90 and the sign bit. This information is fed into third memory circuit compare means 154. If the number in the stop/lock counter is 3 or larger, if the stop/lock bit is positive and if the motor means 31 is doing a forward step, then a signal will appear on a terminal 156 signifying an overshoot. The overshoot condition sets third memory means 150. With third memory circuit means 150 in the set condition, gain control terminal 82 is not active. This opens switch means 178. With switch means 178 opened, the effective resistance in the circuit is increased. With increased resistance, the gain at node 168 is increased. This increased gain is transmitted via power amplifier 164 to motor means 31. This increased gain to motor means 31 will minimize the overshoot of the motor during the performance of the following step command.

While the invention has been particularly shown and described with reference to a preferred embodiment thereof, it will be understood by those skilled in the art that various changes in form and detail may be made therein without departing from the spirit and scope of the invention.

What is claimed is:

1. An incremental tape transport with an adaptive gain control and rotary head magnetic tape unit comprising:
    a take-up spool;
    a motor operably connected to rotate said spool;
    a tape supply,
    rotating means cooperating with a length of tape running between said supply and said take-up spool to trace a traverse path across said length of tape;
    said tape having a plurality of data tracks spaced at intervals and having servo indicia for at least certain tracks;
    transducing means operable to read said servo indicia to determine misalignment of said rotating means with its data tracks;
    means to generate a tape step command;
    means for sensing the overshoot and/or undershoot of the motor;
    means for comparing the overshoot/undershoot with a predetermined threshold value; and
    means to adjust the amplitude of the voltage driving the motor so as to minimize ringing of the motor.

2. The device as claimed in claim 1 further including non-linear circuit means associated with said adjustment means to limit the amplitude of the voltage gain to said motor.

3. The device as claimed in claim 2 wherein the non-linear circuit means includes a zenner diode.

4. The device as claimed in claim 1 further including:
    tension control means positioned between the supply spool and the take-up spool to control tape tension; and
    movement detection means operably connected to the motor for sensing and feeding back positional information.

5. The device as claimed in claim 1 wherein the means to sense motor overshoot/undershoot includes:
    direction detector means to sense direction of rotation and output signals indicative of positional movement;
    stop/lock means operably connected to said direction detector means to output a number indicative of a voltage for controlling the motor;
    converting means operably associated with said stop/lock means for converting the number into a voltage level; and
    logic means operably associated with said stop/lock means to output a signal indicative of the gain adjustment.

6. The device as claimed in claim 5 wherein the converting means is an digital-to-analog converter.

7. The device as claimed in claim 5 wherein the logic means includes a plurality of logical circuitry, said logical circuitry comprising:
- a first logical "And" circuitry which outputs a signal when the motor is moving forward;
- first memory means operably associated with said "And" circuitry to output a signal indicative of a forward step;
- a second logical "NOR" circuitry operably connected to said first memory means for outputting a signal when the motor is moving forward;
- a logical "NOR" circuit means operably associated to control said second logical "NOR" circuit;
- second memory means connected to said second logical "NOR" to sense and output a signal at the first occurrence of an overshoot or undershoot; and
- timing circuit means connected to said second memory means;
- said timing circuit means being operable to output a pulse when the overshoot/undershoot is being sensed.

8. The device as claimed in claim 7 wherein the memory means is a latch.

9. The device as claimed in claim 1 wherein the compare means comprises:
- a third circuit means for receiving a plurality of input signals and outputting a single signal when the input signals are logically true; said output signal being indicative of an overshoot;
- a fourth circuit means for receiving a plurality of input signals and outputting an undershoot signal when the input signals are logically true; and
- a third memory means to receive the output signal from the third circuit means and the fourth circuit means and outputting a gain adjustment signal.

10. The device as claimed in claim 1 wherein the gain adjustment means includes:
- first amplifier means operably connected to drive the motor;
- second amplifier means connected to the first amplifier means; said second amplifier means outputting a control signal for driving the first amplifier means;
- feedback resistive means interconnecting the output of said second amplifier means to its input;
- input resistive means operably connected to the feedback resistive means;
- control means operably associated with said resistive means;
- said control means being positioned so as to switch the resistive means in either a series or series parallel combination, thereby adjusting the gain and hence the output signal from the second amplifier means.

11. The device as claimed in claim 10 wherein the control means is a switch.

12. A helical scan type drive having a rotating head for traversing a magnetic media along parallel disposed information tracks wherein each track is identified by servo indicia to be sensed by the rotating head, including means to align the rotating head with a selected information track and motor means to rotate a take-up spool so as to position the magnetic media in transducing relationship with said rotating head;
the improvement including in combination comprising:
- means to detect the overshoot and/or undershoot of the motor subsequent to completing a step command;
- means to compare the overshoot and/or undershoot with a predetermined range;
- memory means for storing the compare results if the overshoot and/or undershoot being outside of said predetermined range; and
- means to adjust the voltage gain of the motor so as to minimize the ringing.

13. A servomechanical system including in combination a motor having an output shaft;
- a movement feedback transducer operably associated with said shaft for providing signals indicative of movements of said shaft;
- control means operably associated with said feedback transducer to generate a signal indicating motor overshoot and/or motor undershoot;
- control means to receive the overshoot and/or undershoot signal and outputting a signal when the overshoot and/or undershoot signal is equal to or greater than a threshold value; and
- means for adjusting the voltage driving the motor when the overshoot and/or undershoot is outside of the threshold value so as to minimize ringing.

14. The device as claimed in claim 13 further including amplifier means for driving the motor.

15. The device as claimed in claim 13 further including load means operably connected to the motor output shaft.

16. The device as claimed in claim 15 wherein the load means is variable.

* * * * *

UNITED STATES PATENT AND TRADEMARK OFFICE
CERTIFICATE OF CORRECTION

PATENT NO. : 4,032,982
DATED : June 28, 1977
INVENTOR(S) : N. K. Arter and H. C. Jackson It is certified that error appears in the above-identified patent and that said Letters Patent are hereby corrected as shown below:

Column 1, line 54, "frist" should be --first--.

Column 2, line 17, "Thus" should be --This--.

Column 4, line 50, after "the" insert --two--.

Column 7, line 13, "pulse" should be --pulses--.

Column 9, line 32, after "logical" insert --NOR--.
          line 63, "15" should be --154--.

Column 12, line 2, "not" should be --now--.

Signed and Sealed this

Sixth Day of December 1977

[SEAL]

Attest:

RUTH C. MASON
Attesting Officer

LUTRELLE F. PARKER
Acting Commissioner of Patents and Trademarks